United States Patent
Mihajlovic

(10) Patent No.: US 7,839,549 B2
(45) Date of Patent: Nov. 23, 2010

(54) THREE-DIMENSIONAL AUTOSTEREOSCOPIC DISPLAY AND METHOD FOR REDUCING CROSSTALK IN THREE-DIMENSIONAL DISPLAYS AND IN OTHER SIMILAR ELECTRO-OPTICAL DEVICES

(76) Inventor: Zoran Mihajlovic, PMB 195, 1019 Old Monrovia Rd., Huntsville, AL (US) 35806

( * ) Notice: Subject to any disclaimer, the term of this patent is extended or adjusted under 35 U.S.C. 154(b) by 177 days.

(21) Appl. No.: 11/584,032

(22) Filed: Oct. 20, 2006

(65) Prior Publication Data
US 2007/0121028 A1 May 31, 2007

Related U.S. Application Data

(60) Provisional application No. 60/728,815, filed on Oct. 20, 2005.

(51) Int. Cl.
*G02B 5/32* (2006.01)
*G03H 1/26* (2006.01)

(52) U.S. Cl. .......................................... 359/15; 359/23

(58) Field of Classification Search ............... 359/15, 359/22, 32, 463
See application file for complete search history.

(56) References Cited

U.S. PATENT DOCUMENTS

| 5,521,724 A * | 5/1996 | Shires | 359/22 |
| 7,027,203 B2 * | 4/2006 | Trezza | 359/291 |
| 7,298,552 B2 * | 11/2007 | Redert | 359/463 |

* cited by examiner

*Primary Examiner*—Audrey Y Chang

(57) ABSTRACT

This Patent Application describes invention in form of a design of three-dimensional (3D) autostereoscopic displays and other similar electro-optical devices, and also describes a method for reducing crosstalk in said 3D displays and in other similar electro-optical devices, such as in the electro-optical devices that perform optical switching, optical processors, optical data storage, etc. The improvement of the image quality as a result of the decrease of the size of the samples of Holographic/Diffractive Optical Element without increased crosstalk and/or superposition of extraneous images in the image reconstruction is also achieved by the use of the invention described in this Patent Application.

2 Claims, 5 Drawing Sheets

THREE-DIMENSIONAL AUTOSTEREOSCOPIC DISPLAY AND METHOD FOR REDUCING CROSSTALK IN THREE-DIMENSIONAL DISPLAYS AND IN OTHER SIMILAR ELECTRO-OPTICAL DEVICES

BACKGROUND OF THE INVENTION

1. Field of Invention

This invention relates to three-dimensional (3D) autostereoscopic displays and other similar electro-optical devices.

2. Introduction

Several 3D displays, such as 3D displays described in [1, 2, 4, 7, 5, 6], and some other similar 3D displays, all suffer from similar problems, such as crosstalk, aberrations, deformed Modulation Transfer Function, etc. As it is obvious from the examples listed here, many 3D displays suffer from crosstalk.

It is possible to try to minimize that crosstalk, or any other distortion in the image, in several ways. The 3D display described in [1] and in [4] is based on the concept of grating cells (FIGS. 1(A), 1(B)). Each pixel of the display is divided into an array of subpixels, and each subpixel is covered with a diffraction grating cell of such period and orientation that it directs light to the center of corresponding (virtual) viewing slit when activated.

The problem with the architecture like the one described in [1], and in [4], is that it requires very small grating cells, and that existing technology cannot provide that. Even if it can provide that, in the design of a 3D display that was described in [1], and in [4], there was a conflict of interests because on one hand smaller grating cells provide more views, etc., while on the other hand smaller grating cells create more crosstalk (since the size of a pixel is limited, and since the sum of the areas of all grating cells is equal to the area of the pixel (so larger number of grating cells results in smaller grating cells), and since the decrease of the size of grating cell results in the increase of crosstalk), and are more difficult to manufacture and are more expensive, etc.

The area of each grating cell, which is a rectangular aperture, causes appearance of side-lobes in spite of sine grating being used for the grating cell, since the entire transfer function of the 3D display analyzed here includes the transfer function of the rectangular aperture as one of its factors. (One another conflict of interest between parametric variables in this design solution is a consequence of the requirement that the grating cell has to be much larger than grating period, and grating period has to be much larger than wavelength of light (in that case sine phase grating functions as a pure ideal steering element), while grating cell has to be as small as possible, as explained here, since the (optimal) size of the pixel is limited, etc. It is also difficult to fabricate grating cells smaller than what was achieved in [4].)

It has to be also emphasized that this Invention, described in this Patent Application, addresses more than just how to decrease the crosstalk in some three-dimensional displays. The quality of the images increases as the size of grating cells, that are actually the samples of Holographic Optical Element (HOE) or of Diffractive Optical Element (DOE), decreases, because the transfer function of HOE in spatial frequency domain becomes closer to ideal as a consequence (since samples of HOE should be infinitely small in ideal case in order that the sampling does not distort the sampled function), and converges to ideal transfer function as the size of grating cells (samples of HOE) decrease. But decrease of the size of samples of the HOE increases crosstalk and/or superposition of extraneous images in the image reconstruction. Therefore, the optimization described in this Patent Application addresses both the need to increase the number of different views of a three-dimensional image (by making it possible to use smaller grating cells in a display), and the need to improve the image quality, as explained above, by making it possible to decrease the size of samples of the HOE/DOE ("grating cells"), with less problems with the crosstalk as a consequence of that. This is important problem in Computer Generated Holography, in the case of pixelated Spatial Light Modulators in general, and in the case of any spatially sampled HOEs/DOEs in general. In addition, the problem with the solutions that are grouping pixels for the purpose of steering the light from them as from the whole groups of pixels to different directions is that the size of the whole group of pixels has to be small enough in order the pixel grouping not to be observable, which makes design synthesis more difficult (for example, that limits the maximum possible size of pixels below the smallest observable size). One other important advantage of this type of display is that there is a possibility to display all views at once, or at least more than one view (multiple views) at once (at least with solutions based on non-coherent illumination), which is very beneficial since it is difficult to achieve very large space-bandwidth per time unit for 3D displays that is needed.

Due to problems with aberrations, large data rates, nonlinearities, blur, need for wide fields of view and for large displays, etc., some kind of projection is very desirable as a design methodology of 3D displays, and one possible implementation of such design solution of a 3D display is a multi-projector and/or a display that can direct light to different directions, like these design solutions of 3D displays mentioned in this section.

DETAILED DESCRIPTION OF THE INVENTION

Brief Description of the Drawings

FIG. 1. (B): Display (shown partially). D—Display; P—Pixel ; SP—Subpixel ; AP—Entire array of pixels in said display (Front view).

BRIEF SUMMARY OF THE INVENTION

Figure 1:
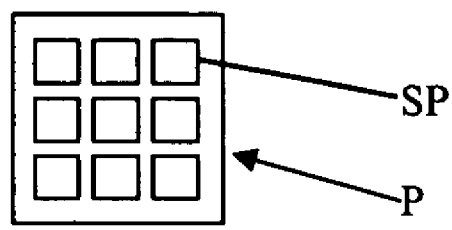
FIG. 1. (A): One pixel in display: P—Pixel ; SP—Subpixel (Front view).
Figure 1:
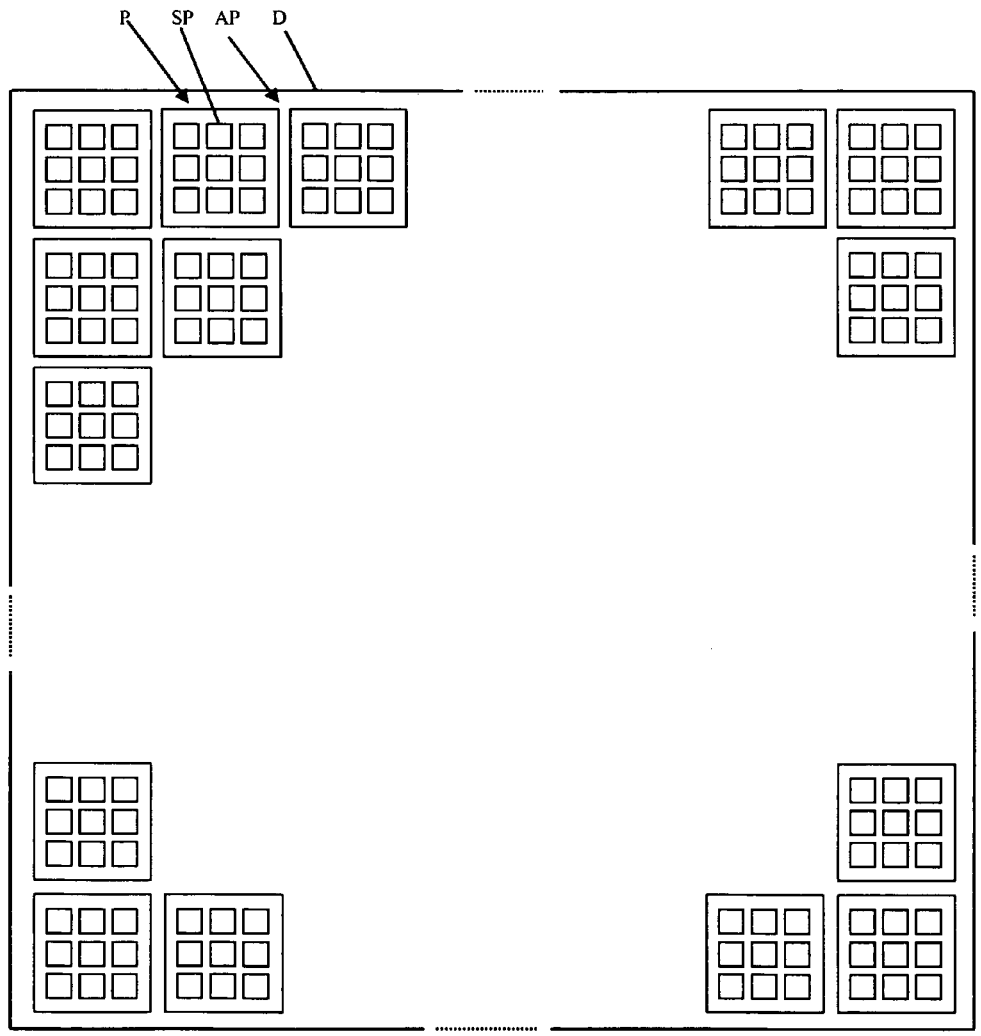

This invention is a three-dimensional display which can have several orders of magnitude more different views than a typical autostereoscopic display currently available on market. It can display much more than one view at a time (per each display unit) etc., with negligible crosstalk, negligible aberrations, and with satisfactory image quality. That autostereoscopic displays currently available on market can provide only so small number of views is a consequence primarily of the limitation of maximum number of frames per second, which the fastest displays currently commercially available, can support. In addition, two or more this three-dimensional displays can be easily combined in order to provide twice or more views than a design based on a single display unit, due to negligible crosstalk of this design. In addition, this design has also achieved various additional improvements of the image quality, such as that it can have as small pixel size and as small pixel pitch as needed, so pixel pitch can be in the range of the average human eye resolution, so depth resolution can be equal to the maximum visible by a human viewer.

Furthermore, this three-dimensional display does not suffer from a reduced image resolution, like some contemporary three-dimensional displays. One more advantage of this design is that the size of the whole group of sub-pixels which steer the light to all different directions can be of the smallest observable size in order the sub-pixel grouping not to be observable by an average human viewer, or it can be even smaller. This design has also achieved the improvement of the image quality as a result of the decrease of the size of the samples of Holographic (Diffractive) Optical Element, or as a result of the decrease of the size of pixels in any optical device in general. In addition, this three-dimensional display can also be flat, and is capable of displaying any kind of two-dimensional image by enforcing all views to be identical. This three-dimensional display can be either a monochromatic three-dimensional display or full color three-dimensional display.

This design of a three-dimensional display has also an advantage that an array of processors for three-dimensional image processing can be easily associated with said three-dimensional display. For example, each pixel of said three-dimensional display can be mapped one-to-one into a corresponding two-dimensional array of two-dimensional arrays processors, while each subpixel is mapped one-to-one into a corresponding two-dimensional arrays of processors, while said processors are connected as so-called systolic arrays of processors, where each processor in an array is connected to its neighboring processors and eventually to some other processors in the entire array. Said processors have to be able to perform desired three-dimensional image processing. As a consequence, three-dimensional image processing with this design of a three-dimensional display associated with said systolic arrays of processors becomes very fast and can be performed by trivial operations such as shifting values of pixels and/or subpixels to adjacent pixels and/or subpixels, etc. Of course, said processors have to be connected with data/address/control buses to said three-dimensional display, for example with optic fibers.

This invention is also described in References 14. and 15., cited below, whose author is the Inventor of this invention.

1.2.1 First Design Solution

Figure 5:
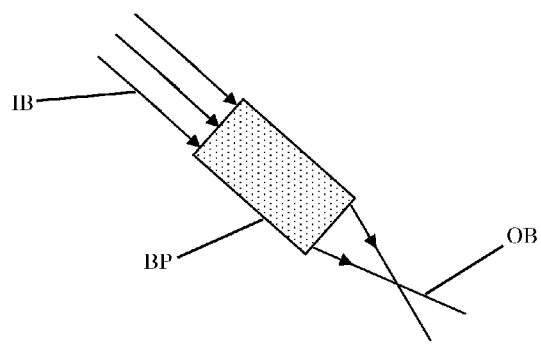
FIG. 5.: Beam Preprocessor (used in FIG. 4.): BP—Beam Preprocessor; IB—input light beam ; OB—output light beam.
Figure 3:
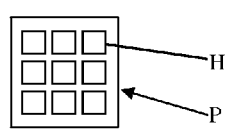
FIG. 3.: One pixel in display: P—Pixel ; H—Hole with micromirror (Front view).
Figure 4:
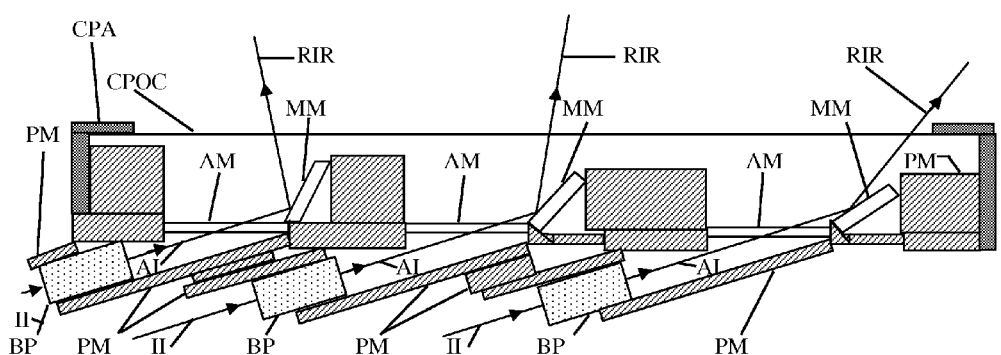
FIG. 4.: Side view of one row of subpixels in FIG. 3. (cross-section): MM—Micromirror; AM—Active Mask ; PM—Passive mask; BP—Beam Preprocessor; CPA—Common Pixel Aperture; CPOC—Common Pixel Optical Component; II—Incident Illuminating light ray; AI—Light ray at the output of BP ; RIR—Reflected Illuminating light ray.

If the parametric variable that represents the width of the slits of the grating in grating cells is made equal to zero, and the parametric variable that represents the index of refraction of grating cells is made equal to −1, making that way the corresponding relations perform pure reflection (Mathematically, this follows from the vector form of Snell's law, if the refraction index of the previous medium is equal to 1. Physically, material with the negative refraction index is something else. Materials with negative refraction index are materials whose permeability and permittivity are simultaneously negative), the grating cells are transformed into small minors, usually called micromirrors (but the micromirrors in this design solution cannot move). That generates this new design based on micromirrors (micromirrors used in this solution are static). The micromirrors can be placed in holes and selected by some kind of Active Mask that covers the inputs of the holes, as shown in FIG. 3. and in FIG. 4. That is, the array of grating cells of each pixel would be replaced by the array of micromirrors, that would be selected by introducing some Active Mask in front of each aforementioned hole, and activated (when desired) by making the mask transparent at the opening of their hole, and blocked (when desired) by making the mask non-transparent (opaque) at the opening of their hole at desired periods of time. (This transformation of the system is again achieved by making the parametric variables that represent the Transmittance of the masks of the holes variable in time. This Active Mask can be also achieved by some selecting screen, made of liquid crystal or any other suitable material, as the one described in Ref. 3 and in Ref. 11, or similar spatial light modulator that generates small apertures.). Each particular micromirror in the array for a given pixel would have some fixed desired angle that is necessary to direct the illuminating beam to the center of the corresponding viewing slit. (The parametric variables that represent the angles of micromirrors are chosen to be variable, as a function of micromirror's position in the array on the pixel). There is also a Beam Preprocessor (BP in FIG. 5. and in FIG. 4.) in front of the each Active Mask to ensure that the illuminating beam at the output of the Beam Preprocessor (ray AI in FIG. 4.) is processed in such way that if Common Pixel Optical Component (CPOC in FIG. 4.) is used in this solution, it produces properly focused beam (with satisfactory maximum optical path difference length (MDOPL)) at viewing slits, and to avoid the undesirable diffraction effects. The addition of Common Pixel Aperture (CPA in FIG. 4.) and eventually CPOC for all micromirrors in each pixel, has the purpose to expand the beam initially at the display's pixel in order to enforce reduction of the spreading of light later that so small micromirrors would create, and that way achieve the desired size of the viewing slit and acceptable crosstalk, since for optical paths longer than Rayleigh range, spread of light and beam size are inversely proportional to the aperture size, since the CPA size is much larger than the size of micromirrors, and since optical paths are longer than Rayleigh range here. The light from micromirrors has to be converging spherical wave that converges to the proper focus (also determined by CPOC, if it is used). Passive Mask is always completely non-transparent. It will not be analyzed in great detail here what is the best way to design beam preprocessors for this purpose. However, beam preprocessors used here have to be designed in such way to minimize unwanted diffraction effects created by beam preprocessors themselves. That can be achieved by designing the geometry that minimizes propagation of unwanted diffraction effects, and by the use of other well-known methodology for that purpose.

In addition to satisfactory MDOPL for each micromirror subsystem, it is also necessary to equalize all optical path lengths for the entire display. However, since optical path lengths for each micromirror subsystem are equalized, that is, since the optical paths from input to the output of each micromirror subsystem are almost equal, they can be all adjusted for the same necessary amount in order to equalize all optical path lengths for the entire display.

The equalization of all optical path lengths for the entire display for all micromirrors, can be achieved by moving each micromirror back or forward within +/−lambda/2 (and adjusting its angle accordingly), in order to change the corresponding optical path length for necessary amount.

1.2.2 Second Design Solution

If the parametric variable that represents the position of micromirrors is made variable in time, and the movement of the micromirrors is made periodic, that results in introduction of resonant micromirrors in this design of a 3D display. If resonant micromirrors are used, it is possible to incorporate a position sensor (capacitive, opto-coupler based, or some other) with each micromirror, in order to detect exact moment when each resonant micromirror is at some reference plane. (If optical type of position sensor is used, then it is possible to distribute the light rays to each micromirror using methodology similar to one described in the previous Section, 1.2.1, using the same methodology used in Section 1.2.1 for directing the input light rays to micromirrors, to direct the input light rays for position sensors, and also for the purpose of directing the output light rays used for position sensors to light detectors. Some additional auxiliary optical components can be used for the purpose of directing light rays for position sensors in desired directions, in such way that each ray intercepts some obstacle that is connected to micromirror, that affects the light in such way that based on that influence the position of the micromirror can be decided. It is also possible to use the input light rays for two purposes: For illuminating the micromirrors, as in Section 1.2.1, and also for position sensors. The optical type of position sensor has various advantages compared to capacitive one, since it is not sensitive to Electromagnetic disturbances, etc.) That way it would be possible to synchronize the light beam from a projector with resonant micromirrors in such way that projector illuminates micromirrors with proper views at proper times, in such way that said views are directed to their corresponding viewing slits. One system that uses resonant mirrors, synchronized with illuminating beam, for a beam deflecting system for holographic storage fast data reading was described in [12]. Of course, if all resonant micromirrors are synchronized, then only one position sensor is needed for the entire micromirror array, otherwise the light beam for each particular micromirror has to be synchronized with its corresponding micromirror.

The motivation for using position sensors and synchronizing the movement of micromirrors for this design solution is based on various unwanted influences, such as instability, current leakage, etc., that affect the movement of micromirrors in such way that the resulting image is distorted too much due to the lack of precise synchronization.

This solution has an advantage that the size of micromirrors can be increased as much as necessary in order to decrease diffraction effect enough in order to reduce crosstalk enough. Of course, if the size of the micromirrors is increased for this purpose, then a two-dimensional array of pixels of proper size has to be displayed by each micromirror (instead of just one pixel). However, the problem with the solutions that are grouping pixels for the purpose of steering the light from them as from the whole groups of pixels to different directions is that the size of the whole group of pixels has to be of the smallest observable size in order the pixel grouping not to be observable, while it is desirable that the size of each pixel is of the smallest size observable by average human viewer, but not smaller than that.

1.2.3 Third Design Solution

Figure 2:
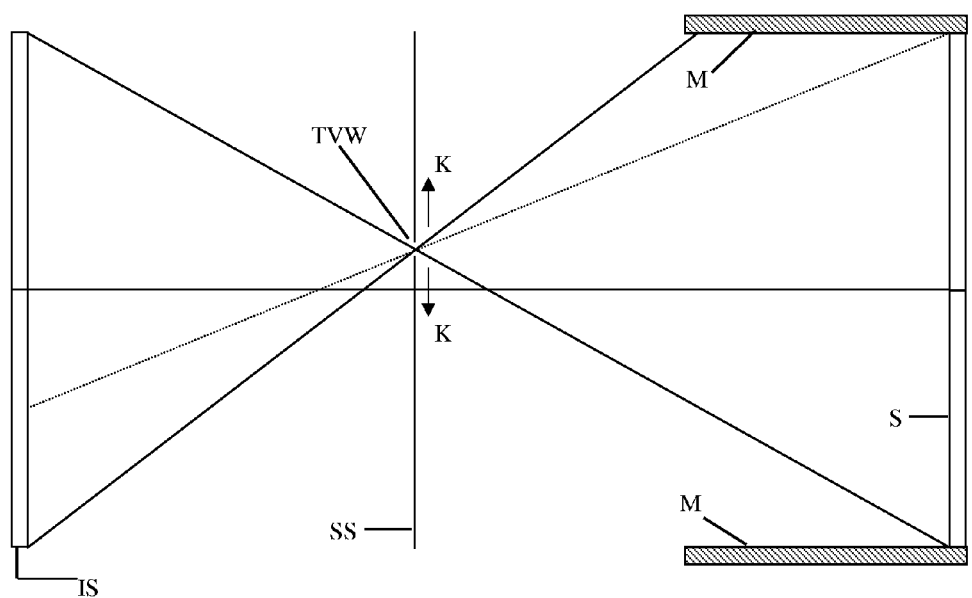
FIG. 2. IS—Illuminating Screen ; M—Non-transparent mask ; TVW—Time-variable window ; K—Direction of movement of the Time-variable window. (It is not necessary to activate the entire Illuminating screen for this particular position of the TVW—only down to the dotted line).

There is a conflict of interests in the designs of this type: While it is desirable to increase the size of the spatial Time-Variable Window, TVW, in order to minimize the unwanted diffraction from it, it is also desirable to decrease its size in order to minimize the propagation of unwanted diffraction from grating cells to viewing slits. Based on that, it is beneficial to transform the design in such way that one more screen with grating cells is added (IS in FIG. 2.) only for the purpose of illuminating at different angles the display that generates the 3D image (S in FIG. 2.), that results in the increase of the total number of views, as elaborated in the first iteration of the design synthesis, in Section 1.2.1 (In addition, the image display's HOEs/DOEs have to be designed for the system that uses point source light for illumination by the use of Eqs. (9) and (10) given in Ref. 7, but with direction cosines of the incident beam vector calculated for each pixel for the point source of light used for the illumination.) That is, by changing the angle of illuminating beam for each particular HOE/DOE made of grating cells (that directs light to some particular viewing slit) on the image display S when that HOE is used (so if the total change of the angle of illuminating beam for each particular HOE/DOE is N times larger than the required angle between viewing slits, the total number of viewing slits is increased N times, since changing the angle of the illuminating beam makes it possible for some grating cell, and its corresponding entire HOE/DOE, to direct the light to N viewing slits, instead to just one, as in the original design).

The advantage of this solution is that the size of grating cells in the illuminating screen IS can be made larger (For example by increasing the size of pixels, and the size of grating cells as a consequence, which would result in the decrease of resolution, but that can be tolerated for the illuminating screen to some extent. But the decrease of resolution can be tolerated much more for the illuminating screen, IS, than for the image display, S), in order to make possible to decrease the size of a Time-Variable Window TVW, since the increase of the size of grating cells results in the decrease of the angle between the main lobe and the first order side-lobes, so as a consequence the side-lobes intercept the Selecting Screen SS at a shorter distance from the center of the Time-Variable Window TVW. (As it was mentioned in Section 2, (Introduction), the area of each grating cell, which is a rectangular aperture, causes appearance of side-lobes in spite of sine grating being used for the grating cell, since the entire transfer function of the 3D display optimized here includes the transfer function of the rectangular aperture as one of its factors.)

In that case it is possible to decrease the size of the Time-Variable Window TVW as much as necessary to achieve that the angle between the main lobe and the first order side-lobes produced by the diffraction of the opening of the Time-Variable Window TVW is large enough to ensure that the side-lobes which the TVW itself produces do not reach the image display S, and instead go aside and intercept the non-transparent mask M (if first order side-lobes produced by the TVW go aside, then the side-lobes of the higher order than the first will also go aside and miss the image display). It is also possible to use here in this designs apodization, serrated aperture edges, proper dimensioning of the system, etc., in order to minimize the side-lobes produced by the diffraction of the opening of the Time-Variable Window TVW. But in this solution the minimization of the side-lobes produced by the diffraction of the opening of the Time-Variable Window TVW should be easier to achieve due to less constrained design solution, that is, due to removing the conflict of interests described at the beginning of this section.

DETAILED DESCRIPTION OF THE PREFERRED EMBODIMENT

1.2.4 Fourth Design Solution

Figure 6:
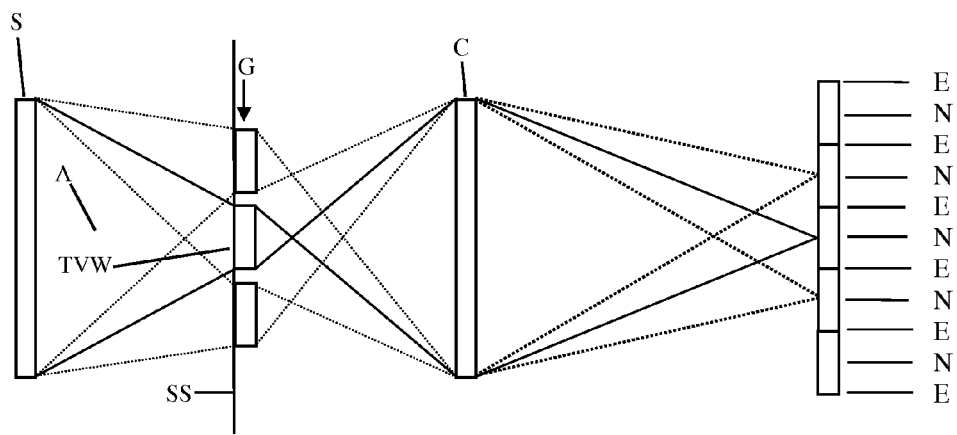
FIG. 6.: S—Display with grating cells or other sub-pixel elements; G—Two-dimensional array of HOEs or other optical components; C—Common HOE/DOE or other common optical element; SS—Selecting screen ; TVW—Time-variable window (open at central position here); E—border of each viewing slit ; N—center of each viewing slit.
Figure 1:
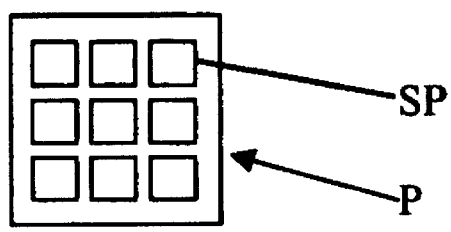
Figure 1:
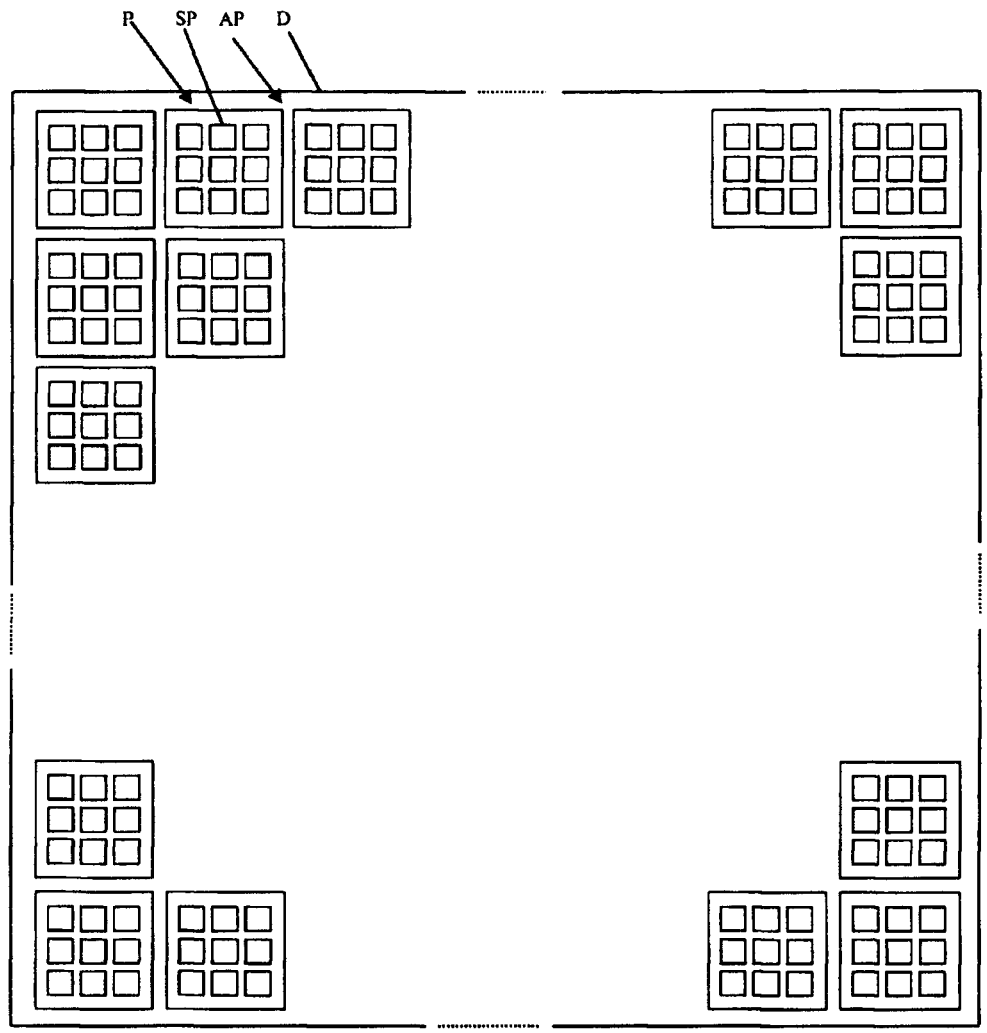
Figure 2:
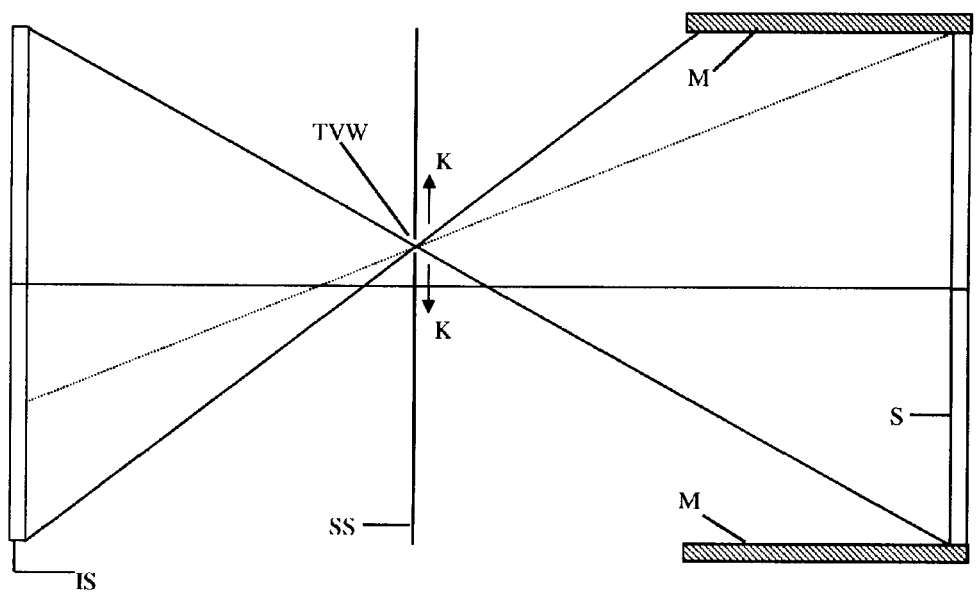
Figure 5:
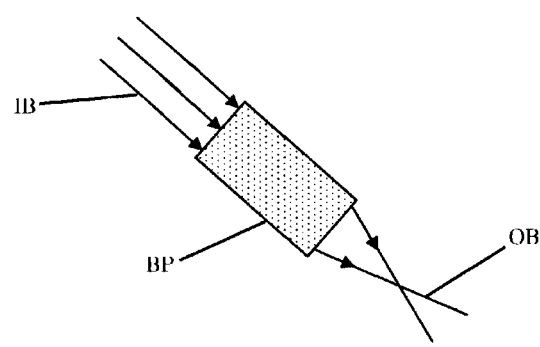
Figure 3:
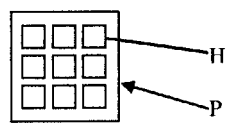
Figure 4:
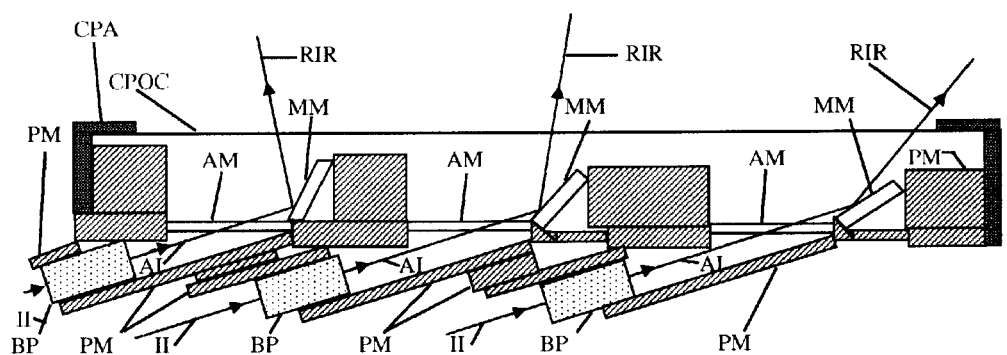
Figure 6:
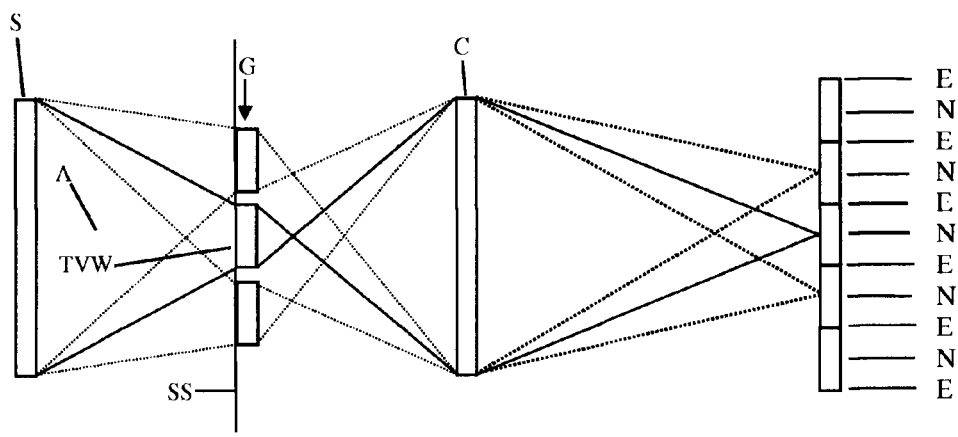

In this solution a vertical two-dimensional ("2D") array of proper HOEs/DOEs (or any other appropriate optical components) is added immediately behind the Selecting screen SS (FIG. 6.). The Time-Variable Window, TVW, selects the HOE/DOE (or any other appropriate optical component) in the array that has to be transparent at a given moment. The total number of HOEs in the array is equal to the number of viewing slits, and the diameter of each HOE/DOE (or any other appropriate optical component) is equal to the size of viewing slit. The presence of aperture in the path of the light beam, that is of equal size as desired viewing slit, enforces that the size of the viewing slit is limited and approximately equal to the size of that aperture, as long as the total optical path from that aperture to the viewing slit is smaller or equal to the Rayleigh range. That is, the aperture will constrain the light that is produced by the diffraction which is a consequence of small grating cells or any other sub-pixel elements used to produce and steer light to viewing slits. As a result, the size of viewing slits is no more determined by the diffraction pattern of sub-pixel apertures. One such solution is described in FIG. 6. The aperture of each HOE/DOE (or any other appropriate optical component) in the vertical 2D array G in FIG. 6. has the size of the viewing slit. For the aperture diameter equal to the size of viewing slit of 3.0 mm, and for the 550 nm wavelength of light, Rayleigh range is approximately 12.8 m, so there is plenty of distance available for optical path. Each optical path (starting from display with grating cells or other sub-pixel elements, through chosen HOE or other optical component in array G in FIG. 6., then through Common HOE or other common optical element, to corresponding viewing slit) has to be optimized for satisfactory maximum optical path difference length (MDOPL). It is possible to secure negligible aberrations in this design solution since each particular view of a three-dimensional image in this design solution has its own separate part of its entire optical path, and since all other necessary and sufficient assumptions for that to be true are valid. Of course, it is possible to add as many surfaces and/or optical components to each aforementioned separate part of the entire optical path in order aberration minimization algorithm in proper optical design software to be able to achieve negligible aberrations. The aberration minimization in any proper optical design software is able to achieve negligible aberrations if the total number of surfaces and/or optical components in optical path is not limited. In addition, maximum possible length of the optical path is not critical, since in the worst case it has only to be shorter than the Rayleigh range for the smallest aperture in the system, which gives in this case length of the Rayleigh range longer than ten meters.

It has to be emphasized here that this design solution is not limited to spatial filtering in focal plane only. This design solution performs spatial filtering either in focal plane or anywhere in the vicinity of focal plane. Said spatial filtering is performed by Selecting screen (SS in FIG. 6.), more specifically by the Time-Variable Window (TVW in FIG. 6). The goal of said spatial filtering is to remove the beam anywhere out of its corresponding viewing slit, and also to secure that the beam spreads over the entire of its corresponding viewing slit. (In addition to said spatial filtering to secure that the beam spreads over the entire its corresponding viewing slit, it is also necessary that the beam itself spreads enough to fill the entire viewing slit, but since very small size of said subpixels is highly desired in this design, this is naturally easily achieved). As a consequence, this design solution makes it possible for a viewer to center (position) her/his eyes anywhere within the viewing slit, since it is provided that rays from each subpixel spread over its entire corresponding viewing slit (but not out of it). Of course, when viewer centers her/his eyes at some point other than the center of viewing slit, the observed image might have somewhat degraded quality due to aberrations being larger than negligible away of the center of the viewing slit. However, since the angle which viewing slit subtends is small, it is also possible to perform aberration minimization in any proper optical design software with the goal to achieve negligible aberrations in the entire (each) viewing slit of this design.

It is possible to secure negligible crosstalk in the image plane of this design solution of three-dimensional display, provided that the entire optical path is within Rayleigh range, based on the proof provided in section 6.2 of this Inventor's article, Ref. 15. In addition to said proof, it is also possible to prove said claim, that it is possible to secure negligible crosstalk in the image plane of this design solution, if it is made in such way that said spatial filtering performed by Selecting screen (SS in FIG. 6.), more specifically by the Time-Variable Window (TVW in FIG. 6) is made to be the front focal plane of the entire optical system which follows after it, and that said entire optical system which follows after it performs an even number of Fourier transforms. If the entire optical system which follows after Selecting screen (SS in FIG. 6.) performs an even number of Fourier transforms, the output of said optical system and the three-dimensional display will as a consequence also be the same or similar spatial spectrum cut out by the Time-Variable Window (TVW in FIG. 6), so it is possible to enforce the same size (or some other desired size) of said spatial spectrum of the beam, as well as the same size of the beam, to be equal to the size of said spatial spectrum of the beam and the size of the beam cut out by the Time-Variable Window (TVW in FIG. 6) at the position of Selecting screen (SS in FIG. 6.). As a consequence, this design solution will also cut out any undesired spread of beam, not only the spread of beam caused by diffraction due to small subpixels. Said undesired spread of beam can be a consequence of the fact that displays diffuse light.

One additional advantage of this design solution is that it is also possible to cut out only a part of the beam with the Time-Variable Window (TVW), and that way to effectively change the angle of the beam at the corresponding viewing slit, since the center of the displayed image and the entire displayed image will be moved that way away from the center of the display for some distance. This way it is possible to further improve the quality of displayed three-dimensional images, since it is desired that a viewer can change the angle of her/his eyes positioned at some position (at viewing slits here), since Human vision is capable of changing the angle of the eyes when watching a three-dimensional image. Of course, the entire display has to be properly adjusted for this possibility to work, by generating views which have two or more different angles for a given viewing slit, etc.

Furthermore, it is also possible to use adaptive lens as the HOEs/DOEs (or any other appropriate optical components)

in two-dimensional array of them (G in FIG. 6.). In that case it is also possible to change the effective focal length of the system made of the display's HOE/DOE and the selected HOE/DOE in two-dimensional array (G), and that way to effectively change the focal length of the first stage (S in FIG. 6.). This way it is possible to further improve the quality of displayed three-dimensional images, since it is also desired that the focal length of the display's HOE/DOE can be varied for the purpose of generating even more natural three-dimensional images.

It has to be emphasized here that this solution is not exclusively based on the concept of grating cells for the purpose of steering light. Each pixel of the display is divided into an array of subpixels, and each subpixel is either covered with a diffraction grating cell of such period and orientation that it directs light to the center of corresponding (virtual) viewing slit when activated, or some other device instead of grating cell can be used for the purpose of steering light, for example the device made of one or more static micromirrors and/or micro lenses and/or micro prisms, as described in section 1.2.1, First design solution here above.

It would be interesting to make the display described in this solution as flat as possible, for several reasons: (1) The shorter the total optical path, the narrower can be virtual viewing slits ; (2)) The shorter the total optical path between the display with grating cells or other sub-pixel elements (S), and the two-dimensional array of HOEs or other optical components (G), the smaller is the spread of light from the grating cells or other sub-pixel elements in the display (S), so it is possible to open more than one opening in the Time-Variable Window (TVW) at a time, that selects the HOEs in the array that have to be transparent at a given moment. That way more than one view can be displayed at a time, which increases total time-bandwidth product per time unit for this 3D display (for contemporary displays it is not necessary to display all views at the same time, it is enough to display every Mth view (where M is some integer)). Of course, this works because some crosstalk that is small enough can be tolerated; (3) Flat 3D displays are attractive for various reasons.

One problem with this minimization of the thickness of the 3D display is that it is somewhat difficult to make diffractive or holographic optical elements with small f/# number for various practical reasons. However, it is possible to use other optical elements, such as refractive or reflective, or hybrid diffractive—reflective components, that can have very small f/# number, or to use the optical element based on one or more static micromirrors and/or micro lenses and/or micro prisms, as described in section 1.2.1, First design solution here above.

Display's DOE/HOE (S in FIG. 6.) is actually a spatially sampled Fresnel Zone Plate, that is, spatially sampled lens (Fresnel zone plate(s) sampled at equal distances. The structure made of the grating cells for each corresponding viewing slit described in Ref. 4 and in Ref. 7 is also a Fresnel zone plate sampled in spatially equidistant manner, with resulting samples being linearized (Ref. 10)).

In order to make hybrid (diffractive—reflective or diffractive—refractive or reflective—refractive) versions of the above described design solutions, a refractive lens can be added to DOE/HOE in the first stage of Fourth solution of this invention (S in FIG. 6.), and also in the first stage of the First solution of this invention, and also in the first (IS in FIG. 2.) and in the second stage (S in FIG. 2.) of the Third solution of this invention, as a common refractive lens for all spatially sampled Fresnel Zone Plates, for the purpose of optimizing DOE/HOE/micromirror array design (Common refractive lens has to be focused at the center of central position of Time Variable Window position ((TVW) in the second stage (SS) in FIG. 6.)). If such refractive lens is added to the DOE/HOE, as a common refractive lens for all spatially sampled Fresnel Zone Plates, for the purpose of optimizing DOE/HOE design, each (spatially sampled) Fresnel Zone Plate in it in the simplest case degenerates to a grating of some particular grating period and orientation. This is the result of added common refractive lens taking the function of focusing light, so there is no more need for Fresnel Zone Plates to focus light, they are just needed to steer light to the center of corresponding viewing slit, which an ordinary grating can do.

(If such refractive lens is added in the first stage of the First solution of this invention, as a common refractive lens for all micromirrors (all arrays of micromirrors are actually spatially sampled mirrors), for the purpose of optimizing the design, each micromirror array (which corresponds to some particular viewing slit) in it in the simplest case degenerates to a micromirror array of some particular orientation, the same for all micromirrors in the array.) Therefore, what is needed for the first stage of Fourth solution of this invention (S in FIG. 6.), and also for the first (IS in FIG. 2.) and in second stage (S in FIG. 2.) of the Third solution of this invention, is a two dimensional array of two dimensional arrays of micro gratings, each of which has some particular grating period and orientation. That is, grating period and orientation of each micro grating (grating cell) is a function of its position in the array in the pixel. More particularly, the DOE/HOE which is needed for these designs is a two dimensional array of pixels, while each pixel is also a two dimensional array of micro gratings, each of which has some particular grating period and orientation. Therefore, instead of spatially sampled Fresnel Zone Plates, the DOE/HOE which is needed would be made of spatially sampled gratings, combed together in a two dimensional array of pixels, while each pixel is also a two dimensional array of spatial samples of these gratings. In order to synthesize this DOE/HOE it suffices to synthesize gratings masked (spatially sampled) with their corresponding two-dimensional arrays of sub-pixels, (where sub-pixel pitch is equal to pixel pitch required for a display of satisfactory resolution, and size of sub-pixel is actually size of grating cell). The whole procedure has to be repeated until the entire two-dimensional array of sub-pixels (grating cells) is generated for each pixel in a display.

In addition to the above described simple design of the DOE/HOE which is needed for the above mentioned designs of a three-dimensional display, there is also a possibility to slightly vary grating period and orientation of each particular micro grating in order to minimize aberrations. While this solution would probably make the rest of the design cheaper, since the rest of (second stage) design would have a smaller burden to minimize aberrations in that case, this solution would in principle make the first stage (DOE/HOE) of the design more expensive. Therefore, based on the costs of these two possible solutions it should be possible to choose the better one. However, the above described possibility makes it much easier to make the design, since it is much easier to make a large grating than a large DOE/HOE and to have negligible aberrations, etc., and would also have all advantages of designs made of replicated gratings, etc., (and/or of any proper replicated planar structures, such as replicated gratings).

Figure 7:
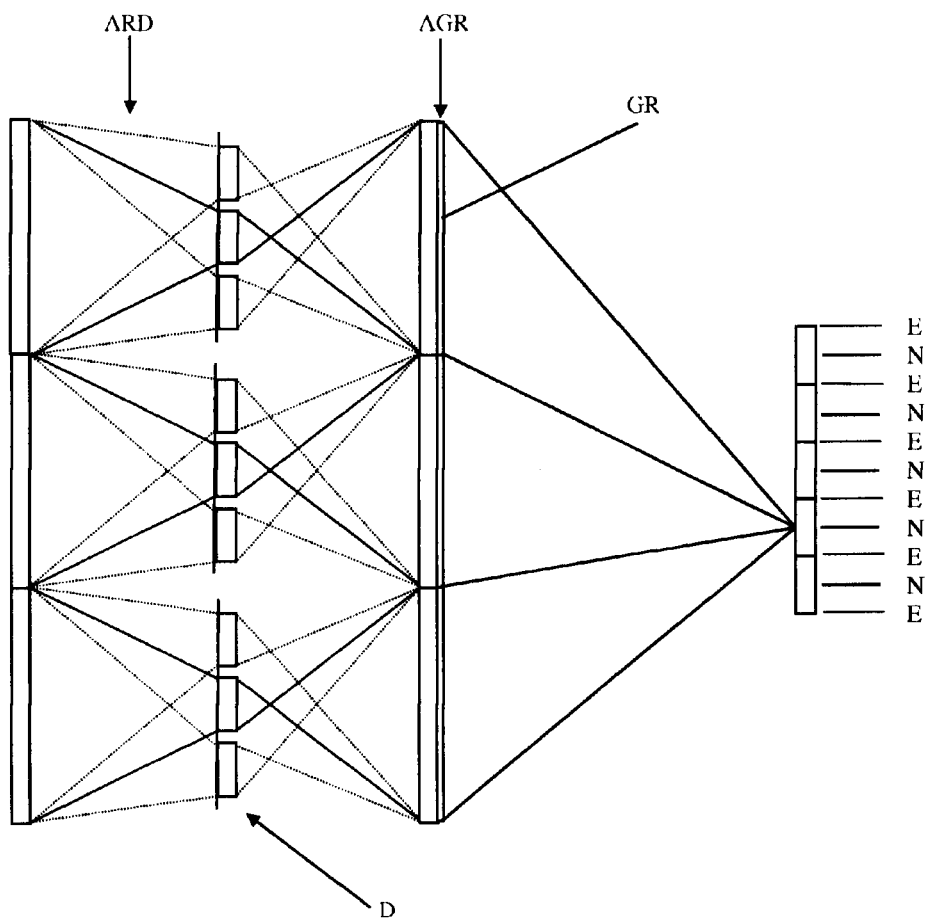
FIG. 7.: Display as a combination of smaller replicas of the solution described in section 1.2.4 (only one view generated shown). ARD—Array of replicated displays; D—one display replica in said array of replicated displays; AGR—Array of gratings for adding offset angle to the output of each display replica; GR—One grating in said array of gratings; E—border of each viewing slit; N—center of each viewing slit.

In order to make the display described in this solution as flat as possible, it is also beneficial to make this design as a combination of smaller replicas of the solution described in this section (FIG. 7.). That way it is possible to achieve smaller total thickness of this solution for a given minimum possible f/# number of said DOE/HOE which is used, since smaller replicas of the solution described in this section will have K times smaller diameters than the entire display, where K is the total number of replicas in each row/column (K is equal three in FIG. 7.), assuming that the number of replicas is equal in each row/column. Since f/# number is a ratio of focal length and diameter, smaller diameter for a given minimum possible f/# number will result in smaller focal length, and as a consequence in smaller total thickness of the display. In addition, in order this design solution as a combination of smaller replicas of the solution described in this section to function in a proper way, it is also necessary to add means for adding offset angle to the output of each said display replica. Gratings are used in this design solution as said means for adding offset angle to the output of each said display replica (FIG. 7: AGR—Array of gratings for adding offset angle to the output of each display replica; GR—One grating in said array of gratings).

In order to maximize the total number of views which this solution can display at a time, it is beneficial to spread as much as possible the HOEs/DOEs (or any other appropriate optical components) in two-dimensional array of them (G in FIG. 6.). Normally, the two-dimensional array of HOEs or other optical components in FIG. 6. can be made as large as the entire device, that is, as large as display S, or eventually even somewhat larger, in order to maximize the distance between the HOEs/DOEs (or any other appropriate optical components) in the two-dimensional array G. As a consequence, it is possible to open more than one Time-variable window (TVW in FIG. 6.) in Selecting Screen SS at a time. The distance between the Time-variable windows which can be opened at the same time is equal to the size of the beam of intensity slightly larger than negligible (small enough so the crosstalk which will be produced by all other beams generated at the same time will be negligible). In the case when some apodization of the beam is done, by either apodizing subpixels, or pixels, or entire display, so that only the main lobe of the diffracted beam remains without any sidelobes after apodization, the distance between the Time-variable windows which can be opened at the same time has to be slightly larger than half the size of the main lobe (where the size of main lobe is equal to the distance between first zeros of the diffracted pattern), in order to maximize the number of Time-variable windows which can be opened at the same time, and as a consequence the number of views which can be produced at the same time.

This design solution of a three-dimensional display can be either monochromatic three-dimensional display or full color three-dimensional display. The above provided description suffices for a description of a monochromatic three-dimensional display. In order this three-dimensional display to be a full color three-dimensional display, it is possible to either have three separate sets of grating cells for the corresponding three basic colors (RGB) like in Ref. 3, or to have three different angles for the corresponding three basic colors (RGB) display illumination beams, where said angles are chosen in such way that the output beam angles from said gratings have always the same desired angles, equal to the angles in monochromatic version. Here all said beam angles are defined as the angles between the beam direction and one or more reference axes. In addition, in order that the said solution based on different RGB angles works properly, the optical components which follow after the display's HOE/DOE have to be either achromatic or made of three different components, arranged in such way that each one receives only the beam of one of the corresponding three basic colors (RGB).

This design solution can have several orders of magnitude more different views than a typical autostereoscopic display currently available on market. It can display much more than one view at a time (per each display unit) etc., with negligible crosstalk, negligible aberrations, and with satisfactory image quality. That autostereoscopic displays currently available on market can provide only so small number of views is a consequence primarily of the limitation of maximum number of frames per second, which the fastest displays currently commercially available, can support. In addition, two or more this three-dimensional displays can be easily combined in order to provide twice or more views than a design based on a single display unit, due to negligible crosstalk of this design. In addition, this design solution has also achieved various additional improvements of the image quality, such as that it can have as small pixel size and as small pixel pitch as needed, so pixel pitch can be in the range of the average human eye resolution, so depth resolution can be equal to the maximum visible by a human viewer. Furthermore, this design solution of a three-dimensional display does not suffer from a reduced image resolution, like some contemporary three-dimensional displays. One more advantage of this design solution is that the size of the whole group of sub-pixels which steer the light to all different directions can be of the smallest observable size in order the sub-pixel grouping not to be observable by an average human viewer, or it can be even smaller. This design solution has also achieved the improvement of the image quality as a result of the decrease of the size of the samples of Holographic (Diffractive) Optical Element, or as a result of the decrease of the size of pixels in any optical device in general. In addition, this design solution of a three-dimensional display can also be flat, and is capable of displaying any kind of two-dimensional image by enforcing all views to be identical.

The description herein discloses the following apparatus:
(1) an autostereoscopic three-dimensional display comprising of following elements optically coupled and arranged in series on the optical path in following order from beginning (a) to end (e):

(a) A two-dimensional pixelated display, wherein the two-dimensional pixelated display comprises one of a liquid crystal display, a cathode ray tube display, and a plasma display, (b) A set of spatially sampled Holographic Optical Elements (HOEs) or of Diffractive Optical Elements (DOEs) of each said Holographic Optical Element (HOE) or said Diffractive Optical Element (DOE) being means for steering light to its corresponding virtual viewing slit, wherein said Holographic Optical Elements (HOEs) or said Diffractive Optical Elements (DOEs) have their corresponding focal planes, where said spatial samples of said sampled Holographic Optical Elements (HOEs) or of said Diffractive Optical Elements (DOEs) are combined in two-dimensional arrays of subpixels within each pixel, made of said spatial samples of Holographic Optical Elements (HOEs) or of said Diffractive Optical Elements (DOEs), said set of spatially sampled Holographic Optical Elements (HOEs) or of Diffractive Optical Elements (DOEs) being integrated with said two-dimensional pixelated display, wherein each said pixel of the display is divided into an array of said subpixels, and each said subpixel is covered with said spatial sample of said Holographic Optical Element (HOE) or of said Diffractive Optical Elements (DOE), that directs light to the center of corresponding said virtual viewing slit when activated, (c) A spatial filtering means for cutting out the light beam anywhere out of its corresponding said virtual viewing slit, where size of said virtual viewing slit can be as small as determined by formula for calculating Rayleigh range which gives relation between size of aperture and distance from the aperture where size of the light beam propagating from the aperture remains constant, said distance being called Rayleigh range, where size of the aperture in said formula for calculating Rayleigh range is replaced by the size of said virtual viewing slit and where said distance in said formula for calculating Rayleigh range is the distance from the plane of said virtual viewing slit to that said aperture in said autostereoscopic three-dimensional display which determines what is the minimum possible size of the light beam in said virtual viewing slit, said spatial filtering being performed either in said focal plane of said corresponding HOE or DOE or anywhere in the vicinity of said focal plane (said focal plane coinciding with plane of a selecting screen or being near said selecting screen), said spatial filtering being performed by said selecting screen, more specifically by a Time-Variable Window formed at time intervals when the corresponding said virtual viewing slit is generated at the position of said corresponding HOE or DOE, or at positions of several said corresponding HOE or DOE if multiple said virtual viewing slits are formed, in said selecting screen, where the said aperture of said Time-Variable Window determines what is the minimum possible size of the light beam in said virtual viewing slit, said spatial filtering removing the beam anywhere out of its corresponding said virtual viewing slit, and also to secure that the beam spreads over the entire of its corresponding said virtual viewing slit said beam spread also being secured b means of very small size of said subpixels, so said spatial filtering also being means for a viewer to be able to center (position) her/his eyes anywhere within said virtual viewing slit, and said spatial filtering also being means for displaying more than one view at a time (per each said display unit), said spatial filtering also being means for the pixel pitch to be in the range of the average human eye resolution, so depth resolution and image resolution to be equal to the maximum visible by a human viewer, (What is meant here above in Section (c) is that said spatial filtering also being means for the pixel pitch to be in the range of the average human eye resolution without causing the light beam spreading anywhere out of its corresponding said virtual viewing slit due to the pixel pitch being in the range of the average human eye resolution (so consequentially depth resolution and image resolution to be equal to the maximum visible by a human viewer, since: (i) pixel pitch being in the range of the average human eye resolution, (ii) the light beam spreading anywhere out of its corresponding said virtual viewing slit, so consequentially depth resolution based on motion parallax can be equal to the maximum visible by a human viewer, and because depth resolution based on binocular disparity can be equal to the maximum visible by a human viewer based on the possibility that pitch of said subpixel can be small enough for said purpose of depth resolution based on binocular disparity to be equal to the maximum visible by a human viewer, so consequentially, since depth resolution of a 3D display to be equal to the maximum visible by a human viewer, must encompass depth resolution based on motion parallax equal to the maximum depth resolution based on motion parallax visible by a human viewer, and must encompass depth resolution based on binocular disparity equal to the maximum depth resolution based on binocular disparity visible by a human viewer, the apparatus disclosed herein achieves depth resolution equal to the maximum visible by a human viewer, since it avoids the aforementioned problem that pixel pitch, which is needed for depth resolution based on binocular parallax equal to the maximum visible by a human viewer, exceeds maximum pixel pitch which is acceptable for depth resolution based on motion parallax, which causes spreading of the light beam out of its corresponding said virtual viewing slit, etc.

Depth resolution based on binocular parallax (and image resolution) to be equal to the maximum visible by a human viewer requires very small size of a pixel, while very small size of a pixel is in conflict with the requirement of depth resolution (and image resolution) to be equal to the maximum visible by a human viewer because depth resolution based on motion parallax equal to the maximum visible by a human viewer requires small enough viewing slits and small inter-view separation, and because pixel pitch, which supports depth resolution based on binocular parallax equal to the maximum visible by a human viewer, is smaller than pixel pitch, which supports image resolution equal to the maximum visible by a human viewer, so consequentially width of the image spectrum at focal point of the lens, which has size equal to the size of the entire display, for pixel pitch, which supports depth resolution based on binocular parallax equal to the maximum visible by a human viewer, is larger than width of the image spectrum at focal point of the lens, which has size equal to the size of the entire display, for pixel pitch, which supports image resolution equal to the maximum visible by a human viewer (width of said image spectrum, which corresponds to pixel pitch which supports image resolution equal to the maximum visible by a human viewer, is equal to average size of human eye pupil), which prevents depth resolution based on motion parallax equal to the maximum visible by a human viewer because width of said image spectrum is larger than average size of human eye pupil, so if nothing else, the aperture of viewer's eye pupil would serve as a spatial filter and filter out parts of said spectrum which exceed size of the aperture of viewer's eye pupil (in this apparatus the spatial filtering means would perform said spatial filtering prior to light reaching the aperture of viewer's eye pupil) so consequentially the viewer would not see (the smallest perceptible binocular disparity, and any binocular disparity small enough to be filtered out this way) binocular disparity which corresponds to parts of the spectrum which were cut out—because they were cut out, so it exceeds maximum inter-view separation necessary for depth resolution based on motion parallax equal to the maximum visible by a human viewer.

It also has to be emphasized here that the methodology of sufficiently small sub-pixels and not too small pixels does not solve the problem alone, since there is still too wide undesired spread of light due to small sub-pixels, which is solved by methodology of said spatial filtering, so therefore, the problem is solved using two aforementioned methodologies together.

Therefore, in this apparatus it is achieved that depth resolution based on binocular parallax equal to the maximum visible by a human viewer is achieved by sufficiently small size of a sub-pixel for that purpose without width of the image spectrum being larger than the size of the corresponding viewing slit, where said viewing slit has size of an average human pupil in daylight (which is also optimal size of human eye pupil) of 3 mm, which is possible since depth resolution based on binocular parallax is determined by binocular disparity (which is shift between the image seen by the left eye and the image seen by the right eye) since width of the image spectrum remains constant when the image is shifted. In this apparatus it is further achieved that depth resolution based on motion parallax equal to the maximum visible by a human viewer is achieved by sufficiently small size of a sub-pixel for that purpose without width of the image spectrum being larger than the size of the corresponding viewing slit, where said viewing slit has size of an average human pupil in daylight (which is also optimal size of human eye pupil) of 3 mm, which is possible since depth resolution based on motion parallax is determined by shift between adjacent views, since width of the image spectrum remains constant when the image is shifted. Of course, pixel pitch is not affected by size of a sub-pixel, since pixel pitch is obviously determined by the size of a pixel (more precisely, inactive size around of the pixel also has to be taken into account for calculating pixel pitch, but this issue is not important for this analysis—some typical inactive size around the pixel can be assumed for the purpose of this analysis). In this apparatus width of the image spectrum is determined by pixel pitch, while in this apparatus for each particular image sub-pixel pitch is also equal to the pixel pitch, since for each particular image only one sub-pixel per each corresponding pixel is used. Furthermore, width of image spectrum is inversely proportional to display's pixel pitch, while it does not depend of any eventual shift of the image. Furthermore, for the purpose of this analysis it is also not important which size of a sub-pixel is smaller—the one with which depth resolution based on binocular parallax equal to the maximum visible by a human viewer is achieved, or the one with which depth resolution based on motion parallax equal to the maximum visible by a human viewer is achieved, since the smallest of the aforementioned two sizes of a sub-pixel has to be adopted for this apparatus to achieve both depth resolution based on binocular parallax equal to the maximum visible by a human viewer and depth resolution based on motion parallax equal to the maximum visible by a human viewer, while it is not important for this analysis which one is that.

It was also necessary to take into consideration here the aforementioned spread of light due to diffraction of light generated by aperture of a pixel of the display.))

(d) An array of Holographic Optical Elements (HOEs) or of Diffractive Optical Elements (DOEs), the total number of said HOEs or said DOEs in the array being equal to the number of said virtual viewing slits, while the diameter of each said HOE or said DOE is equal to the size of said virtual viewing slit and while said Time-Variable Window (TVW) selects said HOE or said DOE in the array to be transparent by said Time-Variable Window being opened at the position of said HOE or said DOE at such moment that optical path is enabled starting from said display with grating cells or other said subpixel elements, through said chosen HOE or said chosen DOE from said array, then through a Common HOE-to corresponding said virtual viewing slit in order that the presence of said aperture in the path of the light beam, that is of equal size as desired said virtual viewing slit, enforces that the size of the said virtual viewing slit is limited and approximately equal to the size of that said aperture, as long as the total said optical path from that said aperture to the said virtual viewing slit is smaller or equal to the Rayleigh range, having that number of surfaces which is sufficient to secure negligible aberrations, added immediately behind said selecting screen as means for changing direction of beams and as means for securing negligible aberrations, (e) A HOE/DOE,-(added on optical path at distance behind said selecting screen and said array of Holographic Optical Elements (HOEs) or of said Diffractive Optical Elements (DOEs) which is added immediately behind said selecting screen), having number of surfaces, as means for such said optical element where said HOE/DOE functions as a spherical lens, thus directing all input beams to corresponding said virtual viewing slits the way said spherical lens does that.

The preferred embodiment herein further discloses the following variation of what is disclosed in (1) herein above: (2) An autostereoscopic three-dimensional display as disclosed in (1) herein above wherein said spatially sampled holographic optical elements or said spatially sampled diffractive optical elements are replaced with: A two-dimensional array of static micromirrors positioned at such angles to steer light to desired directions, or with a two-dimensional array of microprisms, or with a two-dimensional array of dynamic micromirrors with means for determining the angle of said dynamic micromirrors for means of precise steering of light.

This design solution of a three-dimensional display has also an advantage that an array of processors for three-dimensional image processing can be easily associated with said three-dimensional display. For example, each pixel of said three-dimensional display can be mapped one-to-one into a corresponding two-dimensional array of two-dimensional arrays of processors, while each subpixel is mapped one-to-one into a corresponding two-dimensional array of processors, while said processors are connected as so-called systolic arrays of processors, where each processor in an array is connected to its neighboring processors and eventually to some other processors in the entire array. Said processors have to be able to perform desired three-dimensional image processing. As a consequence, three-dimensional image processing with this design solution of a three-dimensional display associated with said systolic arrays of processors becomes very fast and can be performed by trivial operations such as shifting values of pixels and/or subpixels to adjacent pixels and/or subpixels, etc. Of course, said processors have to be connected with data/address/control buses to said three-dimensional display, for example with optic fibers.

Method for Reducing Crosstalk in 3D Displays and in and Other Similar Electro-optical Devices Method for reducing crosstalk in 3D displays and in and other similar electro-optical devices is described in Section 1.2.4, Fourth design solution above:

A vertical two-dimensional ("2D") array of proper HOEs is added immediately behind the Selecting screen SS (FIG. 6.). The Time-Variable Window, TVW, selects the HOE in the array that has to be transparent at a given moment. The total number of HOEs in the array is equal to the number of viewing slits, and the diameter of each HOE is equal to the size of viewing slit. The presence of aperture in the path of the light beam, that is of equal size as desired viewing slit, enforces that the size of the viewing slit is limited and approximately equal to the size of that aperture, as long as the total optical path from that aperture to the viewing slit is smaller or equal to the Rayleigh range. That is, the aperture will constrain the light that is produced by the diffraction which is a consequence of small grating cells or any other sub-pixel elements used to produce and steer light to viewing slits. As a result, the size of viewing slits is no more determined by the diffraction pattern of sub-pixel apertures. One such solution is described in FIG. 6. The aperture of each HOE (or any other appropriate optical component) in the vertical 2D array G in FIG. 6. has the size of the viewing slit.

The method for reducing crosstalk in 3D displays and in and other similar electro-optical devices described here above reduces said crosstalk in the way described above, by the use of static or time-variable window in optical path as long as said optical path is shorter than the Rayleigh range.

It has to be also emphasized that the invention described in this Patent Application addresses more than just how to decrease the crosstalk in some three-dimensional displays. The quality of the images increases as the size of grating cells, that are actually the samples of Holographic Optical Element (HOE), decreases, because the transfer function of HOE in spatial frequency domain becomes closer to ideal as a consequence (since samples of HOE should be infinitely small in ideal case in order that the sampling does not distort the sampled function), and converges to ideal transfer function as the size of grating cells (samples of HOE) decrease. But decrease of the size of samples of the HOE increases crosstalk and/or superposition of extraneous images in the image reconstruction. Therefore, the optimization described in this Patent Application addresses both the need to increase the number of different views of a three-dimensional image (by making it possible to use smaller grating cells in a display), and the need to improve the image quality, as explained above, by making it possible to decrease the size of samples of the HOE ("grating cells"), with less problems with the crosstalk as a consequence of that. This is important problem in Computer Generated Holography, in the case of pixelated Spatial Light Modulators in general, and in the case of any spatially sampled HOEs in general.

Furthermore, the method for reducing crosstalk described here can also be used for the same purpose (and in the same way as described here) in other similar electro-optical devices, such as in the electro-optical devices that perform optical switching, optical processors, optical data storage, etc.

REFERENCES

1. Susumu Takahashi, Toshiki Toda, Fujio Iwata, "Three-Dimensional Grating Images," SPIE Vol. 1461, Practical Holography V, pp. 199-205, 1991.
2. Toshiki Toda, Susumu Takahashi, Fujio Iwata, "3D video system using Grating Images," SPIE Vol. 1461, Practical Holography IX, pp. 191-198, 1995.
3. Sudo, Toshiyuki, Morishima, Hideki, Osaka, Tsutomu, Taniguchi, Naosato, "3D display using intersection of light beams," Proc. SPIE Vol. 3957, p. 215-224, Stereoscopic Displays and Virtual Reality Systems VII, May 2000.
4. G. P. Nordin, J. H. Kulick, M. W. Jones, R. G. Lindquist, and S. T. Kowel, "A 3-D Display Utilizing a Diffractive Optical Element and an Active Matrix Liquid Crystal Display," Opt. Eng. 35(12), pp. 3404-3412 (1996).
5. Stephen Benton, T. E. Slowe, A. B. Kropp, and S. L. Smith, "Micropolarizer-based multiple-viewer autostereoscopic display," Proc. SPIE Vol. 3639: Stereoscopic Displays and Virtual Reality Systems VI, (January 1999) paper 3639-10.
6. Montgomery, David J.; Woodgate, Graham J.; Jacobs, Adrian M.; Harrold, Jonathan; Ezra, David, "Performance of a flat-panel display system convertible between 2D and autostereoscopic 3D modes," Proc. SPIE Vol. 4297, p. 148-159, Stereoscopic Displays and Virtual Reality Systems VIII, June 2001.
7. J. H. Kulick, G. P. Nordin, A. Parker, S. T. Kowel, R. G. Lindquist, M. Jones, and P. Nasiatka, "Partial pixels: a three-dimensional diffractive display architecture," J. Opt. Soc. Am. A, V. 12, No. 1, pp 73-83, 1995.
8. P. St.-Hilaire, S. A. Benton, M. Lucente, M. L. Jepsen, J. Kollin, H. Yoshikawa, J. Underkoffer, Electronic Display system for computational holography", SPIE V. 1212, Practical Holography IV, pp. 174-182, 1990.
9. Y. Kajiki, H. YOshikawa, T. Honda, "Hologram-Like Video Images by 45-View Stereoscopic Display," SPIE V. 3012, Stereoscopic Displays and Virtual Reality Systems IV, pp. 154-166, 1997.
10. Jendral, Andreas; Bryngdahl, Olof, "Generalized model of synthetic image hologram structures," SPIE V. 2652, pp. 10-14, Practical Holography X, 1996.
11. Pan, Ru-Pin, Tung, Xiou-Xhi, Chen, Jun-Yu, Huang, Ming-Jay, Pan, "Liquid-crystal-based tunable optical filtering devices for DWDM," Ci-Ling, Proc. SPIE Vol. 4532, p. 244-248, 7/2001.
12. R. Kiefer, J. Fontaine, I. E l Hafidi, P. Meyrueis, and R. Grzymala, Y. Takakura, "A Beam Deflecting System For Holographic Storage Fast Data Reading," third annual OSEE (Online Symposium for Electronics Engineers) series, TechOnLine, 35 Crosby Drive, Suite 201, Bedford, Mass. 01730, Nov. 5, 2002.) also published in TechOnline, Nov. 5, 2002.
13. Jeffrey H. Kulick, Michael W. Jones, Gregory P. Nordin, Robert G. Lindquist, Stephen T. Kowel, Presentation and demonstration of a full-color ICVision holographic stereogram display, Proc. SPIE Vol. 2652, pp. 85-95, 1996.
14. Zoran Mihajlovic, Method for formal design synthesis of autostereoscopic displays, Proc. SPIE Vol. 5599, pp. 135-152, Three-Dimensional TV, Video, and Display III, 2004.
15. Zoran Mihajlovic, Method for formal design synthesis of various electro-optical devices including selected aspects of quantum optics/quantum mechanics, Proc. SPIE V. 5867, Optics and Photonics 2005, Optical Modeling and Performance Predictions II, 586707, 2005.

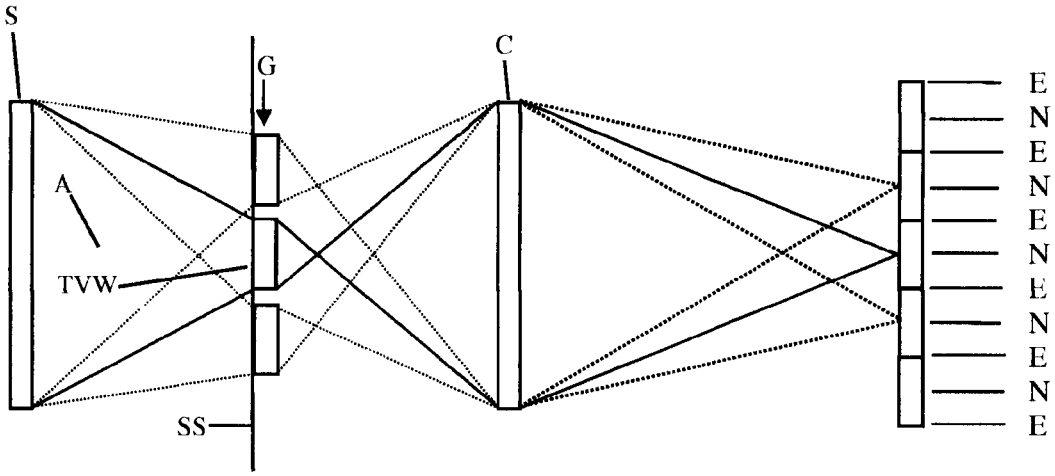

I claim:

1. An autostereoscopic three-dimensional display comprising of the following elements optically coupled and arranged in series on the optical path in the following order starting from the light incidence side:
    (a) A two-dimensional pixelated display,
    (b) A set of spatially sampled first Holographic Optical Elements (HOEs) or of Diffractive Optical Elements (DOEs) wherein each member of said set performs steering of light to its corresponding virtual viewing slit, wherein said HOEs or said DOEs have their corresponding focal planes, such that the two-dimensional pixelated display is integrated with said spatially sampled first HOEs or DOEs which are combined with said two-dimensional arrays of subpixels within each pixel of the display, wherein each said corresponding pixel of the display is divided into an array of said corresponding subpixels, and each said corresponding subpixel is covered with said spatial sample of said first Holographic Optical Elements or of said first Diffractive Optical Elements, to direct light to the centers of corresponding said virtual viewing slits when activated,
    (c) A spatial filtering means for cutting out the light beam, that is comprised of a selecting screen with Time-Variable Window (TVW), located at the focal planes or near focal planes of the corresponding spatially sampled first HOEs or DOEs, having an aperture that determines what is the maximum possible size of the light beam in said virtual viewing slits, providing depth resolution and image resolution equal to the maximum visible by a human viewer,
    (d) An array of second Holographic Optical Elements (HOEs) or of Diffractive Optical Elements (DOEs) (with the total number of said second HOEs or said DOEs in the array being equal to the number of said virtual viewing slits, and with diameter of each of the second HOEs or DOEs in the array equal to the size of the virtual viewing slit), that is located behind the spatial filtering means with the Time-Variable Window (TVW) which selects said second HOEs or DOEs in the array to be transparent to define an aperture in the optical light path with equal size to the size of the virtual viewing slit to allow the light from the subpixels of the display through the spatial filtering means, the array of said second HOEs or DOEs and a common third holographic optical element (HOE) or diffractive optical element (DOE) to the corresponding virtual viewing slit, wherein each of said second HOEs or DOEs change directions of the light beams toward their corresponding said virtual viewing slits, to focus the light beams at the centers of the corresponding virtual viewing slits with negligible aberrations, (e) The common third holographic optical element (HOE) or diffractive optical element (DOE) located on the optical path behind the selecting screen and the array of the second HOEs or DOEs to function as a spherical lens for directing the light from the array of second HOEs or DOEs to the corresponding virtual viewing slits.

2. An autostereoscopic three-dimensional display as claimed in claim 1, wherein said spatially sampled first Holographic Optical Elements or said spatially sampled first Diffractive Optical Elements are replaced with: A two-dimensional array of static micromirrors positioned at such angles to steer light to desired directions, or with a two-dimensional array of microprisms, or with a two-dimensional array of dynamic micromirrors with means for determining the angle of said dynamic micromirrors for means of precise steering of light beams toward the centers of the corresponding virtual viewing slits.

* * * * *

UNITED STATES PATENT AND TRADEMARK OFFICE
CERTIFICATE OF CORRECTION

PATENT NO.         : 7,839,549 B2                                                                 Page 1 of 8
APPLICATION NO. : 11/584032
DATED                 : November 23, 2010
INVENTOR(S)       : Zoran Mihajlovic It is certified that error appears in the above-identified patent and that said Letters Patent is hereby corrected as shown below:

The Title Page, showing an illustrative figure, should be deleted and substitute therefor the attached title page.

Please replace all the drawings with new Figures 1-7.

Signed and Sealed this

Twenty-first Day of December, 2010

David J. Kappos
*Director of the United States Patent and Trademark Office*

(12) United States Patent
Mihajlovic

(10) Patent No.: US 7,839,549 B2
(45) Date of Patent: Nov. 23, 2010

(54) THREE-DIMENSIONAL AUTOSTEREOSCOPIC DISPLAY AND METHOD FOR REDUCING CROSSTALK IN THREE-DIMENSIONAL DISPLAYS AND IN OTHER SIMILAR ELECTRO-OPTICAL DEVICES

(76) Inventor: Zoran Mihajlovic, PMB 195, 1019 Old Monrovia Rd., Huntsville, AL (US) 35806

( * ) Notice: Subject to any disclaimer, the term of this patent is extended or adjusted under 35 U.S.C. 154(b) by 177 days.

(21) Appl. No.: 11/584,032

(22) Filed: Oct. 20, 2006

(65) Prior Publication Data
US 2007/0121028 A1    May 31, 2007

Related U.S. Application Data

(60) Provisional application No. 60/728,815, filed on Oct. 20, 2005.

(51) Int. Cl.
*G02B 5/32* (2006.01)
*G03H 1/26* (2006.01)

(52) U.S. Cl. .......................... 359/15; 359/23

(58) Field of Classification Search .......... 359/15, 359/22, 32, 463
See application file for complete search history.

(56) References Cited

U.S. PATENT DOCUMENTS

| 5,521,724 A * | 5/1996 | Shires ........ 359/22 |
| 7,027,203 B2 * | 4/2006 | Trezza ....... 359/291 |
| 7,298,552 B2 * | 11/2007 | Redert ...... 359/463 |

* cited by examiner

Primary Examiner—Audrey Y Chang

(57) ABSTRACT

This Patent Application describes invention in form of a design of three-dimensional (3D) autostereoscopic displays and other similar electro-optical devices, and also describes a method for reducing crosstalk in said 3D displays and in other similar electro-optical devices, such as in the electro-optical devices that perform optical switching, optical processors, optical data storage, etc. The improvement of the image quality as a result of the decrease of the size of the samples of Holographic/Diffractive Optical Element without increased crosstalk and/or superposition of extraneous images in the image reconstruction is also achieved by the use of the invention described in this Patent Application.

2 Claims, 6 Drawing Sheets